United States Patent [19]

Goans

[11] Patent Number: 5,312,204
[45] Date of Patent: May 17, 1994

[54] FLOATING BARRIER APPARATUS

[75] Inventor: Kip B. Goans, Harvey, La.

[73] Assignee: Oil Stop, Inc., Harvey, La.

[21] Appl. No.: 933,721

[22] Filed: Aug. 24, 1992

Related U.S. Application Data

[63] Continuation-in-part of Ser. No. 752,002, Aug. 29, 1991, Pat. No. 5,195,844, which is a continuation of Ser. No. 638,704, Jan. 8, 1991, abandoned, which is a continuation of Ser. No. 424,158, Oct. 19, 1989, Pat. No. 5,022,785.

[51] Int. Cl.$^5$ .............................................. E02B 15/04
[52] U.S. Cl. ........................................... 405/68; 405/66; 405/63
[58] Field of Search ............... 405/63, 64, 65, 66, 405/67, 68, 69, 70, 71, 72

[56] References Cited

U.S. PATENT DOCUMENTS

| | | | |
|---|---|---|---|
| 3,922,861 | 12/1975 | Grihange | 405/68 X |
| 4,104,884 | 8/1978 | Preus | 405/68 |
| 5,020,940 | 6/1991 | Smith | 405/63 |
| 5,022,785 | 6/1991 | Goans | 405/69 |
| 5,195,844 | 3/1993 | Goans | 405/69 |

FOREIGN PATENT DOCUMENTS

| | | | |
|---|---|---|---|
| 1294889 | 5/1969 | Fed. Rep. of Germany | 405/68 |
| 68413 | 4/1982 | Japan | 405/63 |
| WO91/00393 | 1/1991 | PCT Int'l Appl. | 405/63 |
| 1387123 | 3/1975 | United Kingdom | 405/68 |

*Primary Examiner*—Randolph A. Reese
*Assistant Examiner*—J. Russell McBee
*Attorney, Agent, or Firm*—George A. Bode

[57] ABSTRACT

A boom for collecting material floating on the surface of a body of water comprising: a first collapsible tube which can be stored either as flat layers of folded material or by rolling it on a roller; transverse seals along the length of the first tube to create a longitudinal sequence of first compartments; and, a second tube within the first tube, the second tube having transverse seals to form a longitudinal sequence of second compartments, these second compartments being generally concentric with the first tube and the first compartments. Pressurized gas communicates with each of these separate compartments so as to provide pressurization thereof.

46 Claims, 5 Drawing Sheets

FLOATING BARRIER APPARATUS

This application is a continuation-in-part application of a previous application by the same inventor bearing U.S. Ser. No. 07/752,002 filed Aug. 29, 1991 (now U.S. Pat. No. 3,195,894), which is a continuation of U.S. Ser. No. 07/638,704 filed Jan. 8, 1991 (now abandoned), which is a continuation of U.S. Ser. No. 07/424,158 filed Oct. 19, 1989, now U.S. Pat. No. 5,022,785 issued Jun. 11, 1991. The entire previous application U.S. Ser. No. 07/752,002 is incorporated herein by reference as if set forth in full below.

BACKGROUND OF THE INVENTION

1. Field of the Invention

The invention relates to a method and apparatus for creating a floating boom for collecting floatable material, such as liquid hydrocarbons, floating on the surface of a body of water.

2. Summary of the Prior Art

Conventional oil booms normally comprise an elongated tubular body, generally produced by inflation of a fluid impervious tube to which is secured a depending, oil confining skirt. These booms are normally stored on land or on ship in a collapsed state, either by flat folding of the collapsed tube or by rolling the collapsed tube on a reel. See, for example, U.S. Pat. No. 2,682,151 and No. 3,494,132 which disclose a series of inflatable plastic tubes, the ends of which are interconnected by sleeves. Integrally formed on each tube is a depending hollow fin having a weighted material such as lead shot contained in the lower longitudinal edge of the fin.

U.S. Pat. No. 4,123,911 discloses a continuous inflatable tube. One end of the continuous tube is affixed to the deployment vessel and supplied with pressurized air to effect its inflation. The second end of the tube, after it is fully deployed from the transport vessel on which it was originally stored, is then attached to either a second vessel or to a drogue or some similar means of stationing the second end of the barrier in the sea.

U.S. Pat. No. 4,325,653 provides a collapsible boom which, in its inflated condition, has double buoyancy chambers disposed on each side of a central skirt member. A tension wire is secured to the lower skirt region and two pressurizing hoses are secured to the upper skirt region above the buoyancy chambers. Inflation air is then supplied through the pressurizing air hoses with the preferable arrangement being stated to be the utilization of separate air hoses respectively supplying the individual buoyancy chambers. Pressured air is supplied to the air hoses from an external source via a rotary gland fitted at the reel core axis.

Each of the aforementioned prior art patents has the disadvantage that a leak developing in the inflatable tube can cause severe problems in maintaining the buoyancy of the boom.

An attempt was made to overcome this problem in U.S. Pat. No. 3,792,589 by providing a collapsible boom having a series of longitudinally separated inflatable compartments. Each of these compartments necessarily had to be separately filled through an individual valve as the collapsed tube was dispensed from a storage reel. This obviously greatly increased the time required for effecting the deployment of the boom.

The prior art has failed to disclose a rapidly deployable hydrocarbon retaining boom wherein the collapsible tube forming the boom has longitudinally spaced inflatable compartments insuring that a leak in one compartment does not adversely affect the functioning of the entire boom.

SUMMARY OF THE INVENTION

The invention comprises a collapsible, inflatable boom for confining hydrocarbons and other materials floatable on a liquid surface, such as a body of water, wherein a fluid impervious inflatable tubular element of the boom is provided at longitudinally spaced intervals with transverse seals, thus separating the inflatable tube into a plurality of successive inflatable compartments. Within each such compartment is a second inner compartment that is separately inflatable via different inflation means. Generally, this second inner compartment is concentric with the first compartment to ease its inflation.

As is known in the art, it is desirable that the inflatable tube be provided with a depending fin which is suitably weighted so as to maintain a substantially vertical position in the body of water, thus providing a barrier for the hydrocarbons or other material floating on the surface of the water. In accordance with this invention, such barrier is provided by a hanging collapsible fluid impervious tube which is longitudinally secured to one edge of the compartmented tube and hence deployed into the water concurrently with the compartmented tube. The hanging tube is provided with a plurality of transverse seals dividing the interior of the hanging tube into successive hanging compartments. Each hanging compartment, prior to the sealing thereof, is provided with a weight which can take the form of a chain, lead pellets or a quantity of particulate material having a specific gravity substantially in excess of that of water, such as sand or gravel, which gravitates to the bottom of the hanging tube which is not inflated. Thus, the hanging tube is maintained in a substantially planar configuration depending from the inflated tubes when the tubes are deployed into the body of water.

BRIEF DESCRIPTION OF THE DRAWINGS

FIG. 1 and FIG. 2 are incorporated in the resulting boom;

DETAILED DESCRIPTION OF PREFERRED EMBODIMENTS

Figure 1:
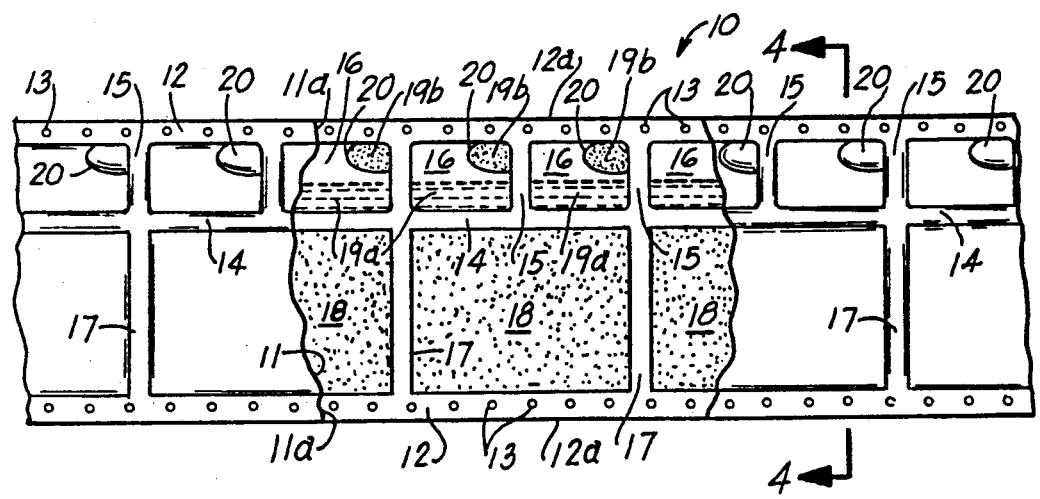
FIG. 1 is an elevational view, partly in section, of a longitudinal portion of a hydrocarbon collecting boom embodying this invention.

Referring to FIG. 1, a boom 10 embodying a first modification of this invention comprises, in its collapsed form, top and bottom walls of an inflatable tube formed of fluid impervious material, which are secured together by heat sealing at their longitudinal edges 11a and 12a. Such edges are provided with a plurality of punched holes 13 by which the resulting collapsed tubular structure may be expeditiously fed by sprocket wheels during the deployment operation.

In addition to sealing, such as by heat, of longitudinal edges 11a and 12a a longitudinally extending heat seal 14 is provided intermediate the longitudinally sealed edges. Transverse heat seals 15 are then provided interconnecting the longitudinal heat seal 14 with the top longitudinally sealed edge and dividing the upper portion of the boom assemblage into a plurality of longitudinally successive compartments 16. Additionally, transversely extending heat seals 17 are provided connecting the longitudinal heat seal 14 with the bottom longitudinal edge seal, thus defining a series of substantially larger longitudinally adjacent compartments 18. Each of the compartments 18 is filled with a weight such as a chain or lead pellets or a granular material, such as sand or gravel, having a specific gravity substantially in excess of that of water and thus the successively connected compartments 18 define a depending fin when the boom is deployed onto a body of water.

Figure 6:
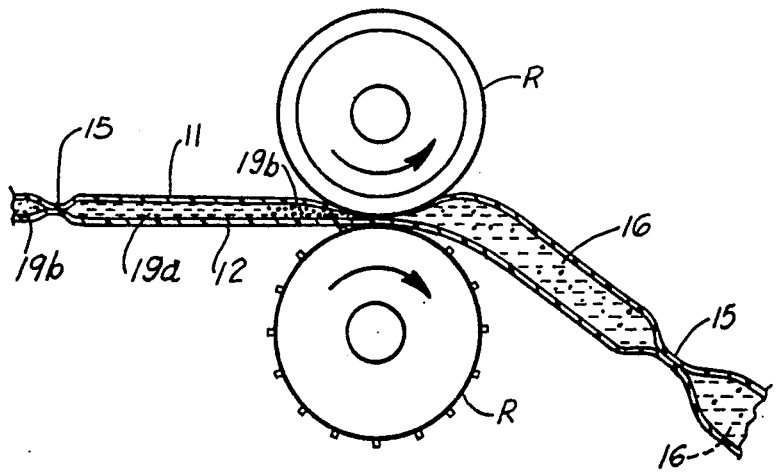
FIG. 6 is a schematic view illustrating the compression of the boom of FIGS. 1 or 3 during the deployment thereof.

Within each of the compartments 16, a plurality of chemicals are disposed which, when mixed, react to produce a gas. For example, the chemicals can comprise granular sodium carbonate 19a and liquid acetic acid 19b, which when mixed, will produce significant quantities of carbon dioxide gas. In accordance with this invention, one of the chemicals, preferably the liquid chemical is enclosed within a small plastic pouch 20 which is tack sealed in a desired position within each of the chambers 16. The liquid containing pouches are preferably disposed in longitudinal alignment and are filled with the liquid chemical to the extent that the thickness of each pouch 20 exceeds that of the collapsed boom 10. Accordingly, when the boom 10 is passed through a pair of compressive rollers in the manner indicated in FIG. 6, the pouches 20 will be successively ruptured and the liquid chemical 19b contained therein will be released to mix with the granulated chemical 19a and produce sufficient carbon dioxide gas to effect the inflation of each of the chambers 16 as the boom 10 is deployed.

Obviously, with the chemical generation of the inflating gas in each of the longitudinally adjacent sealed compartments 16, the boom is deployed without the delays that have been heretofore imposed on prior art structures of laboriously connecting a source of pressured air to each of the inflatable longitudinally adjacent compartments.

Figure 2:
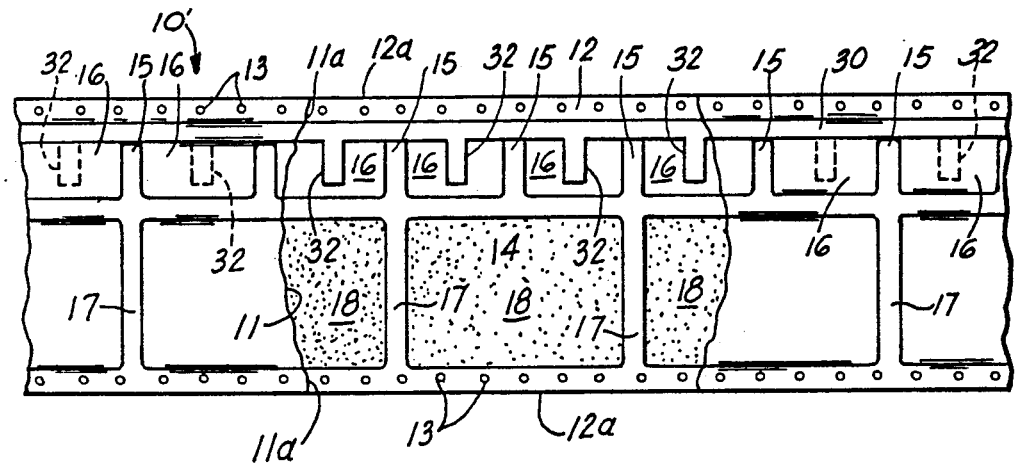
FIG. 2 is a view similar to FIG. 1, but illustrating a modification of this invention.

Referring now to FIG. 2 wherein similar numerals represent structures similar to those disclosed in FIG. 1, there is shown a boom 10' having a plurality of longitudinally spaced sealed compartments 16. No chemicals are provided in the compartments 16, however, and the inflation of the individual compartments 16 is accomplished by the incorporation in the boom structure of a longitudinally extending, collapsible tube 30 which is provided with a plurality of transversely disposed connecting tubes 32 which respectively extend into each of the compartments 16. Optionally, each compartment 16 can be provided with a relief valve 39 to allow air to vent therefrom.

When this type of boom is deployed into the water, the inflation of the longitudinally adjacent compartments 16 is accomplished by applying pressurized air to an end more specifically described as the first-off end of the small diameter tube 30. Such pressured air is supplied through the transverse connecting tubes 32 to each of the longitudinally adjacent sealed compartments 16, thus effecting the inflation of these compartments so long as the fluid pressure is maintained in the small tube 30. Relief valves 39 can allow air to vent out of compartments 16 as air is supplied through tubes 30, 32. In this way cold air (or a liquid) can be blown through tubes 30, 32 to keep the interior of boom 10' cool while deployed to contain burning oil. The depending fin for this boom is formed in exactly the same manner as previously described in connection with FIG. 1 by sealably provided a plurality of adjacent compartments 18 containing a weight such as a chain or lead pellets or sand or gravel to effect the weighting of the compartments so that they maintain their collapsed condition and function as a fin projecting into the water beneath the inflated portions 16.

Figure 3:
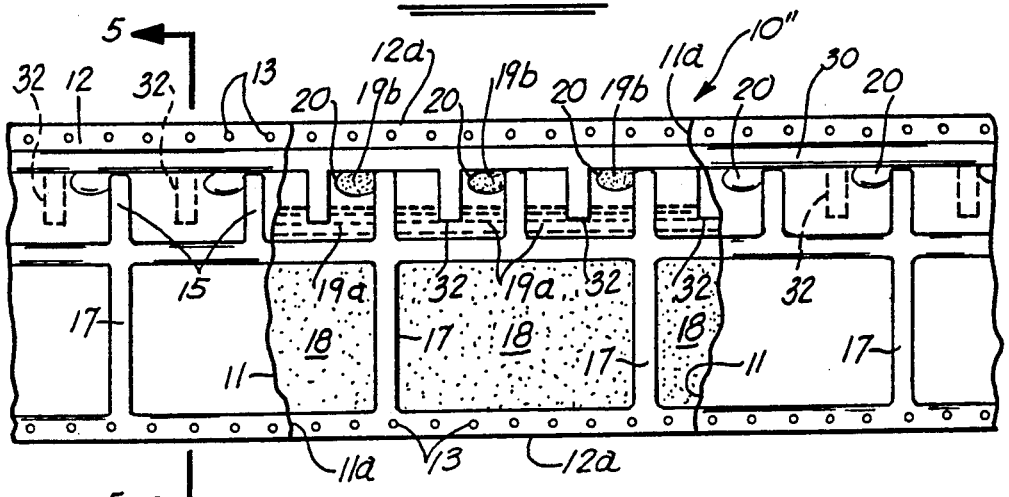
FIG. 3 is a view similar to FIG. 1, but illustrating a second modification of this invention wherein the elements of both
Figure 4:
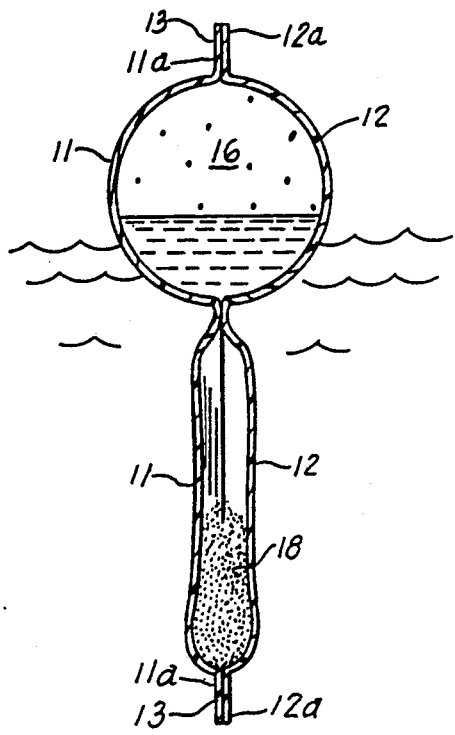
FIG. 4 is a sectional view taken on the plane 4—4 of FIG. 1.
Figure 5:
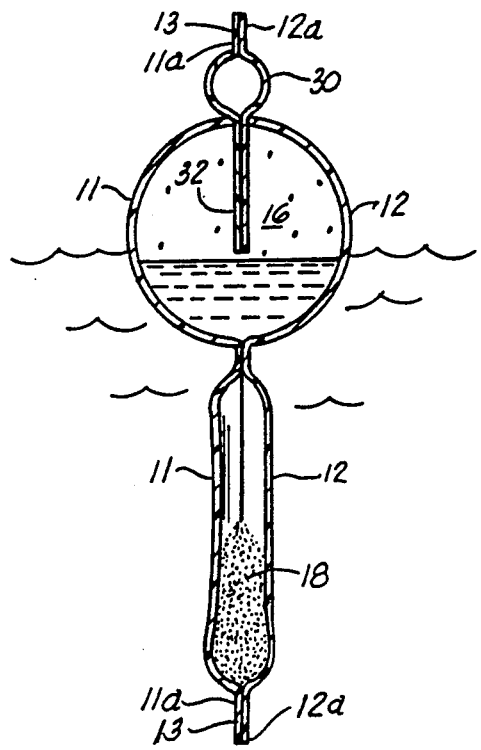
FIG. 5 is a sectional view taken on the plane 5—5 of FIG. 3.

Referring now to FIG. 3 there is shown a still further modification of this invention comprising a boom 10" which incorporates both of the inflation features of the boom 10 of FIG. 1 and boom 10' of FIG. 2. Similar numerals in FIG. 3 represent parts identical to those previously described in connection with FIGS. 1 and 2. Thus, the modification of FIG. 3 employs a mixture of chemicals 19a and 19b contained within each of the longitudinally adjacent compartments 16 to initially effect the inflation of compartments 16 by the rupturing of the pouch 20 containing the chemical liquid component 19b. The mixture of the liquid chemical component with the granulated component results in the production of sufficient gas to inflate the respective longitudinally adjacent sealed compartments 16.

The advantage of the modification of FIG. 3 lies in the fact that if, for any reason, the mixed chemicals fail to produce sufficient gas to effect the inflation of a particular compartment, such compartment can be inflated by pressurized air supplied through the first-off end of the small diameter tube 30 and through the connecting tube 32 extending into the particular compartment. Thus, it can be assured that all compartments 16 are inflated. Those compartments wherein adequate inflation is accomplished by the gases produced by the chemical reaction of the mixed chemicals, are effectively isolated from the air pressure existing in the small diameter tube 30 because the internal pressure in each gas inflated compartment 16 will squeeze the flat ends of the connecting tubes 32 together to prevent leakage through such tubes. Connecting tubes 32 thus function as check valves.

Those skilled in the art will recognize that the various modifications of hydrocarbon collecting booms heretofore described each have the unique advantage of permitting very rapid deployment of the boom into the water and with the assurance that the inflation of all of the longitudinally adjacent sealed compartments can be accomplished during the deployment. Since each of the inflated compartments is relatively small, a leak developing in one compartment will not adversely effect the functioning of the boom.

It will also be noted that the heretofore described hydrocarbon collecting booms are specifically designed for single use applications and employ very economical materials which significantly reduce costs of the boom over that of reusable booms. There is the further cost mitigating circumstance that the rapid deployment capability of booms embodying this invention may well result in substantially reducing the time for entrapping an oil spill on a body of water and the dollar value of this time is very significant from an environmental standpoint.

It will also be recognized that each of the aforedescribed booms can be compactly stored in a folded flat condition on a vessel or wound in a flat collapsed condition on a reel. Either way, the speed of deployment of the boom is not adversely affected.

Figure 7:
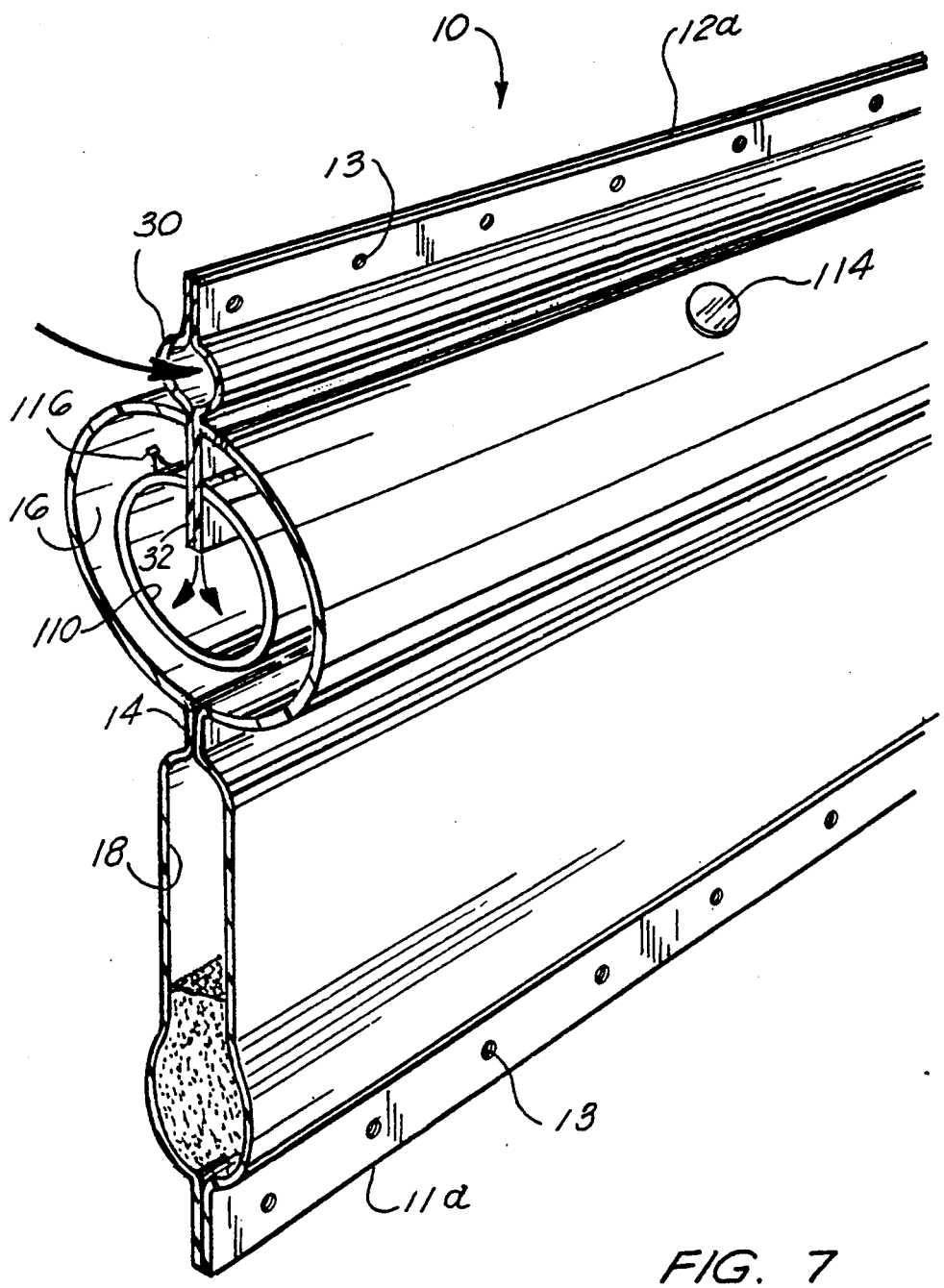
FIG. 7 is a perspective view, partially in section, of an alternate embodiment of the apparatus of the present invention illustrating the many various methods available to inflate both the inner and outer inflatable tubes.

Referring now to FIGS. 7-12, there is shown other alternate embodiments of the invention and various combinations thereof. In FIG. 7, each of compartments 16 enclose a smaller interior compartment 110 that is shown as being concentric with outer compartment 16 when both are inflated. Smaller interior compartment 110 is constructed in the same manner and of similar material as compartment 16 and it too is not bulky, thereby enabling this embodiment to be either folded or rolled for storage purposes.

Lower or hanging compartment 18 of FIGS. 7-12 is, as discussed earlier, filled with a weight such as a chain or lead pellets or a granular material, such as sand or gravel, having a specific gravity substantially in excess of that of water. Thus, the successively connected hanging compartments 18 define a depending fin when boom 10 is deployed onto a body of water.

As shown in the FIGS. 7-12, there are several alternate methods to inflate either or both compartment 16 and 110. One method pertains to the utilization of collapsible tube 30 and connecting tube 32 through which gas will pass in the manner previously discussed to inflate compartment 110. When the pressure within collapsible tube 30 is less than or equal to the pressure within compartment 110, the flat ends of connecting tubes 32 will press against each other, thereby functioning as a check valve to prevent any leakage from compartment 110 from occurring. Once all of compartments 110 are sequentially inflated, tube 30 is no longer pressurized, thus, should a subsequent breach occur in any of compartments 110, the gas will only escape from that compartment due to the flat ends of connecting tubes 32 functioning as a check valve in all the adjacent compartments 110.

Figure 11:
FIG. 11 is an enlarged sectional view, partially cut of away, of a portion of FIG. 10; and, FIG. 12 is a sectional view, similar to FIG. 10, of an alternate embodiment of the present invention.
Figure 10:
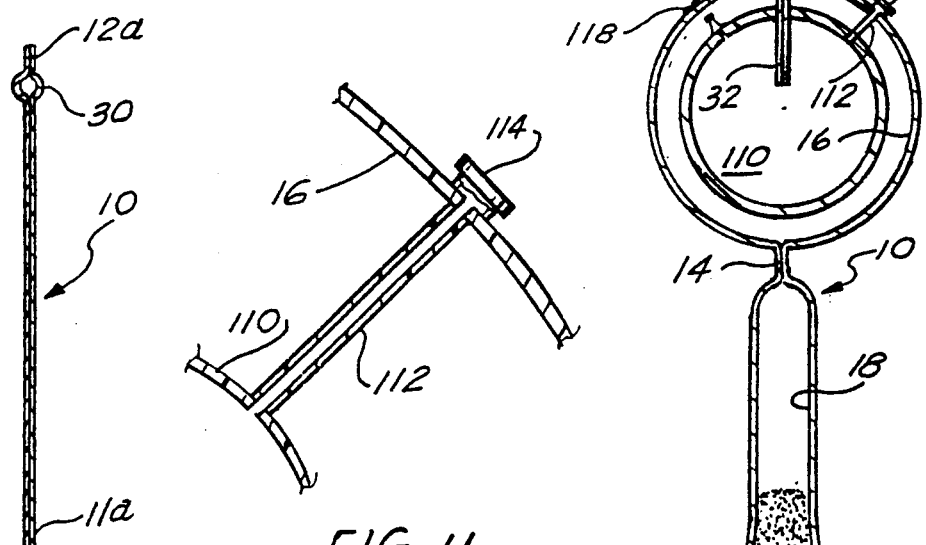
FIG. 10 is a sectional view taken along Lines 10—10 of FIG. 8.

A second method of inflating compartment 110 is best illustrated in FIGS. 10 and 11 in which a valve 112 connects directly to each of compartments 110 sealingly through compartments 16. This valve 112 can be constructed similarly to other air valves which become operable upon the application of a greater pressure, thereby opening a passageway into corresponding compartment 110. Other configurations of valve 112 are also likely. Valve 112 would, by necessity, include a built-in check valve that prevents the accidental loss of pressure from within compartments 110. A cap 114 protects valve 112 from any debris that may wash upon boom 10.

Figure 8:
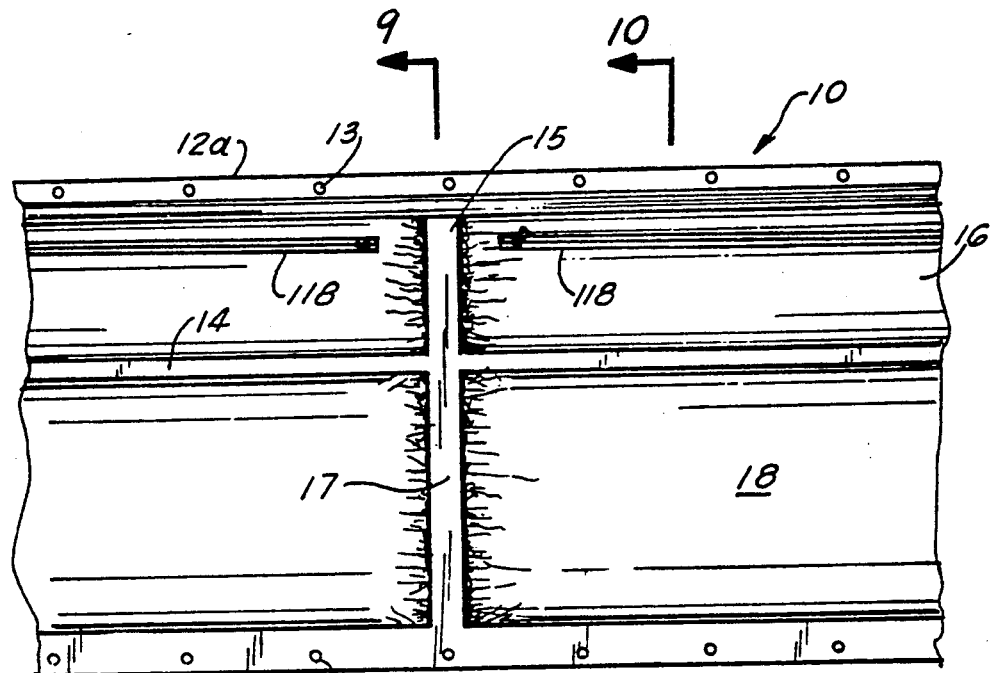
FIG. 8 is an elevational view of a longitudinal portion of the boom embodying the embodiment of FIG. 7 and illustrating the zipper.

A third method of inflating compartment 110 involves a valve 116 connected directly to each of compartments 110. Access to valve 116 is obtained through longitudinal zippers 118 provided in each compartment 16. Zippers 118 are preferably of the resealable variety so that the exterior of corresponding compartments 16 will remain intact and so that compartments 16 can be pressurized. As shown in FIG. 8, zippers 118 extend only along a portion of the length of each compartment 16, but, if such is desired, zippers 118 can extend along the full length of each compartment 16. Valve 116 may also be of the typical variety in that a greater air pressure is needed for operation. Both valves 112 and 116 may also be threaded or otherwise configured at their exterior ends for ease in attachment to an air line.

Still another method of inflating compartment 16 is shown in the FIG. 10. In accordance with this method, valve or port 120 connects with the interior of each compartment 16 to inflate these compartments around inner corresponding compartments 110. This valve 120, similar to valves 112 and 116, may also be of typical construction that includes a check valve therein to prevent the accidental discharge from within compartments 16. When this method of inflation is used, typically, inner compartments 110 would be inflated first, then outer compartments 16 would be inflated through valves 120.

Figure 12:
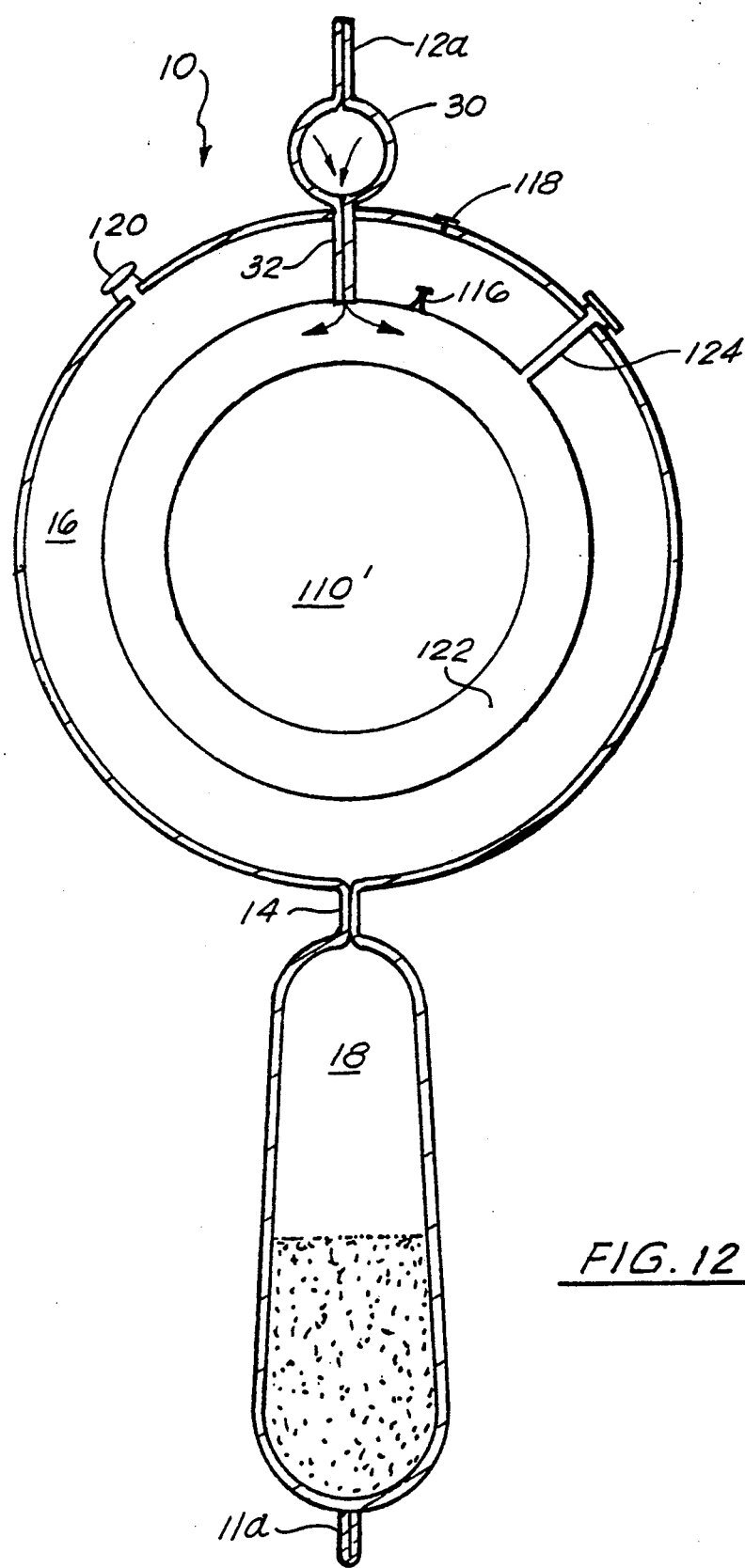

A fifth method of providing the required degree of buoyancy to boom 10 is disclosed in the alternate embodiment of FIG. 12. This method introduces an annular compartment 122 within each compartment 16 that is generally concentric with compartment 16. A valve 124, similar to valve 112 passes through each of compartments 16 to connect with corresponding annular compartments 122. Also shown is a collapsible tube 30 and connecting tube 32 that can be modified to connect with each annular compartment 122 (instead of each compartment 110'). Valve 116 and corresponding zipper 118 are also shown in a slightly modified form so as to provide access to each annular compartment 122 (instead of each compartment 110').

As can be seen from FIGS. 7-12, these embodiments and methods may be combined in any manner desirable so as to achieve the desired degree of buoyancy of boom 10. These multiple methods of inflation also provide a degree safety since a backup method is available should the main or preferred method of inflation not be operable or suitable for the situation at hand. Additionally, having an inflatable smaller inner compartment (i.e., 110 (FIG. 10) or 122 (FIG. 12)) within outer compartment 16 also provides a certain degree of protection since outer compartment 16 could now fail without boom 10 losing all of its buoyancy along that section. The reverse is also true in that the inner compartment 110 or 122 could fail without any effect upon boom 10 since outer compartment 16 would now contain the gases previously held within these inner compartments.

Figure 9:
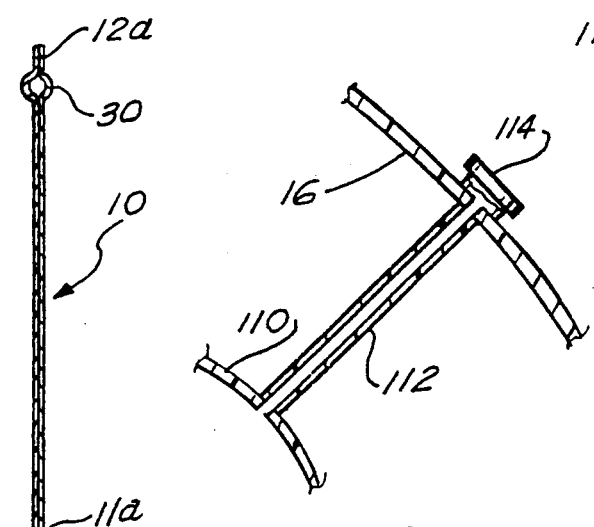
FIG. 9 is a sectional view taken along Lines 9—9 of FIG. 8.

FIG. 9 illustrates a side view of boom 10, along transverse heat seals 15 and 17, indicating that the incorporation of inner compartments 110 or 122 does not make boom 10 excessively bulky. Instead, boom 10 remains thin in its non-inflated state and thus can be rolled or folded for storage as desired.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. An inflatable float boom for confining material floatable on a liquid surface comprising:
   a) a first elongated collapsible tube formed of fluid impervious material, said first tube defining a flat, reelable configuration when collapsed;
   b) a second elongated collapsible tube formed of fluid impervious material and defining a flat, reelable configuration when collapsed, said second tube being disposed within said first tube;
   c) valve means connecting to said second collapsible tube through said first collapsible tube for inflating said second collapsible tube;
   d) a third elongated collapsible tube being formed of fluid impervious material and defining a flat reelable configuration when collapsed, said third tube having a substantially smaller diameter when expanded than said first tube with sealing means longitudinally securing said third tube to said first tube; and,
   e) a plurality of conduits spaced along the length of said third tube and respectively communicating between the bore of said third tube and said second tube, whereby pressurized gas supplied to an end of said third tube produces inflation of said second tube.

2. The apparatus of claim 1, wherein the interior of said first collapsible tube is separated into a plurality of first adjacent compartments sequentially disposed along the length of said first tube.

3. The apparatus of claim 1, wherein said second tube is separated into a plurality of second adjacent compartments sequentially disposed along the length of said second tube and said conduits communicate between said bore and said second compartments, whereby pressurized gas supplied to an end of said third tube produces successive inflation of said second compartments.

4. The apparatus of claim 3, wherein said valve means connects said second adjacent compartments of said second tube through said first adjacent compartments of said first tube for inflating said second adjacent compartments.

5. An inflatable float boom for confining material floatable on a liquid surface comprising:
   a) a first elongated collapsible tube formed of fluid impervious material, said first tube defining a flat, reelable configuration when collapsed;
   b) sealing means separating the interior of said first tube into a plurality of first adjacent compartments sequentially disposed along the length of said first tube;
   c) a second elongated collapsible tube formed of fluid impervious material and defining a flat, reelable configuration when collapsed, said second tube being disposed within said first tube and being separated into a plurality of second adjacent compartments sequentially disposed along the length of said second tube;
   d) valve means connecting to said second adjacent compartments through said first adjacent compartments for inflating said second adjacent compartments;
   e) a third elongated collapsible tube being formed of fluid impervious material and defining a flat reelable configuration when collapsed, said third tube having a substantially smaller diameter when expanded than said first tube with sealing means longitudinally securing said third tube to said first tube; and,
   f) a plurality of conduits spaced along the length of said third tube and respectively communicating between the bore of said third tube and said second compartments, whereby pressurized gas supplied to an end of said third tube produces successive inflation of said second compartments.

6. The apparatus of claim 5, wherein said second adjacent compartments are separated by sealing means.

7. The apparatus of claim 5, wherein said second adjacent compartments are inflatable to become substantially concentric with said first adjacent compartments.

8. The apparatus of claim 7, further comprising;
   a) a hanging elongated collapsible tube formed of fluid impervious material, said hanging tube defining a flat reelable configuration when collapsed;
   b) means for sealingly securing a longitudinal edge of said hanging tube to said first tube;
   c) separating means for dividing the interior of said hanging tube into a plurality of adjacent hanging chambers extending along the length of said hanging tube; and,
   d) a selected quantity of matter disposed in each said hanging chamber, said matter having a specific gravity substantially greater than that of water.

9. The apparatus of claim 5, wherein said conduits have normally collapsed end portions within said second compartments, thereby functioning as check valves.

10. The apparatus of claim 9, wherein said second adjacent compartments are inflatable to become substantially concentric with said first compartments.

11. An inflatable float boom for confining material floatable on a liquid surface comprising:
    a) a first elongated collapsible tube formed of fluid impervious material, said first tube defining a flat, reelable configuration when collapsed;
    b) a second elongated collapsible tube formed of fluid impervious material and defining a flat, reelable configuration when collapsed, said second tube being disposed within said first tube;
    c) valve means connected to said second collapsible tube for inflating said second collapsible tube; and,
    d) zipper means forming a part of said first collapsible tube for providing access to said valve means, said zipper means being resealable and capable of withstanding the pressurization of said first collapsible tube.

12. The apparatus of claim 11, wherein the interior of said first collapsible tube is separated into a plurality of first adjacent compartments sequentially disposed along the length of said first tube.

13. The apparatus of claim 12, wherein the interior of said second tube is separated into a plurality of second adjacent compartments sequentially disposed along the length of said second tube.

14. An inflatable float boom for confining material floatable on a liquid surface comprising:
    a) a first elongated collapsible tube formed of fluid impervious material, said first tube defining a flat, reelable configuration when collapsed;
    b) sealing means separating the interior of said first tube into a plurality of first adjacent compartments sequentially disposed along the length of said first tube;

c) a second elongated collapsible tube formed of fluid impervious material and defining a flat, reelable configuration when collapsed, said second tube being disposed within said first tube and being separated into a plurality of second adjacent compartments sequentially disposed along the length of said second tube; and, d) valve means connecting to said second adjacent compartments for inflating said second adjacent compartments; and, e) zipper means forming a part of said first compartments for providing access to said valve means, said zipper means being resealable and capable of withstanding the pressurization of said first compartments.

15. The apparatus of claim 14, wherein said second adjacent compartments are separated by said sealing means.

16. The apparatus of claim 15, wherein said second adjacent compartments are concentric with said first adjacent compartments.

17. The apparatus of claim 16, wherein said second adjacent compartments comprise an annular inflatable ring within said first compartments.

18. The apparatus of claim 17, further comprising;
a) a hanging elongated collapsible tube formed of fluid impervious material, said hanging tube defining a flat reelable configuration when collapsed;
b) means for sealingly securing a longitudinal edge of said hanging tube to said first tube;
c) separating means for dividing the interior of said hanging tube into a plurality of adjacent hanging chambers extending along the length of said hanging tube; and,
d) a selected quantity of matter disposed in each said hanging chamber, said matter having a specific gravity substantially greater than that of water.

19. The apparatus of claim 14, further comprising:
a) a third elongated collapsible tube being formed of fluid impervious material and defining a flat reelable configuration when collapsed, said third tube having a substantially smaller diameter when expanded than said first tube with said sealing means longitudinally securing said third tube to said first tube; and,
b) a plurality of conduits spaced along the length of said third tube and respectively communicating between the bore of said third tube and said second compartments, whereby pressurized gas supplied to an end of said third tube produces successive inflation of said second compartments.

20. The apparatus of claim 19, wherein said conduits have normally collapsed end portions within said second compartments thereby functioning as check valves.

21. The apparatus of claim 20, wherein said second adjacent compartments comprise an annular inflatable ring within said first compartments.

22. The apparatus of claim 14, further comprising second valve means connecting to said second adjacent compartments through said first adjacent compartments for inflating said second adjacent compartments.

23. The apparatus of claim 22, wherein said second adjacent compartments are separated by said sealing means.

24. The apparatus of claim 23, wherein said second adjacent compartments are concentric with said first adjacent compartments.

25. The apparatus of claim 24, wherein said second adjacent compartments comprise an annular inflatable ring within said first compartments.

26. The apparatus of claim 25, further comprising;
a) a hanging elongated collapsible tube formed of fluid impervious material, said hanging tube defining a flat reelable configuration when collapsed;
b) means for sealingly securing a longitudinal edge of said hanging tube to said first tube;
c) separating means for dividing the interior of said hanging tube into a plurality of adjacent hanging chambers extending along the length of said hanging tube; and,
d) a selected quantity of matter disposed in each said hanging chamber, said matter having a specific gravity substantially greater than that of water.

27. The apparatus of claim 22, further comprising:
a) a third elongated collapsible tube being formed of fluid impervious material and defining a flat reelable configuration when collapsed, said third tube having a substantially smaller diameter when expanded than said first tube with said sealing means longitudinally securing said third tube to said first tube; and,
b) a plurality of conduits spaced along the length of said third tube and respectively communicating between the bore of said third tube and said second compartments whereby, pressurized gas supplied to an end of said third tube produces successive inflation of said second compartments.

28. The apparatus of claim 27, wherein said second adjacent compartments comprise an annular inflatable ring within said first compartments.

29. An inflatable float boom for confining material floatable on a liquid surface comprising:
a) a first elongated collapsible tube formed of fluid impervious material, said first tube defining a flat, reelable configuration when collapsed;
b) sealing means separating the interior of said first tube into a plurality of first adjacent compartments sequentially disposed along the length of said first tube;
c) a second elongated collapsible tube formed of fluid impervious material and defining a flat, reelable configuration when collapsed, said second tube being disposed within said first tube and being separated into a plurality of second adjacent compartments sequentially disposed along the length of said second tube;
d) valve means connecting to said first and second adjacent compartments for inflating said first and second adjacent compartments;
e) a third elongated collapsible tube being formed of fluid impervious material and defining a flat reelable configuration when collapsed, said third tube having a substantially smaller diameter when expanded than said first tube with sealing means longitudinally securing said third tube to said first tube; and,
f) a plurality of conduits spaced along the length of said third tube and respectively communicating between the bore of said third tube and said second compartments, whereby pressurized gas supplied to an end of said third tube produces successive inflation of said second compartments.

30. The apparatus of claim 29, wherein said conduits have normally collapsed end portions within said second compartments, thereby functioning as check valves.

31. The apparatus of claim 30, wherein said second adjacent compartments comprise an annular inflatable ring within said first compartments.

32. The apparatus of claim 29, further comprising second valve means connecting to said second adjacent compartments through said first adjacent compartments for inflating said second adjacent compartments.

33. The apparatus of claim 32, wherein said second adjacent compartments are separated by said sealing means.

34. The apparatus of claim 33, wherein said second adjacent compartments are concentric with said first adjacent compartments.

35. The apparatus of claim 34, wherein said second adjacent compartments are inflatable to become substantially concentric with said first compartments.

36. The apparatus of claim 34, further comprising;
a) a hanging elongated collapsible tube formed of fluid impervious material, said hanging tube defining a flat reelable configuration when collapsed;
b) means for sealingly securing a longitudinal edge of said hanging tube to said first tube;
c) separating means for dividing the interior of said hanging tube into a plurality of adjacent hanging chambers extending along the length of said hanging tube; and,
d) a selected quantity of matter disposed in each said hanging chamber, said matter having a specific gravity substantially greater than that of water.

37. The apparatus of claim 32, further comprising:
a) a third elongated collapsible tube being formed of fluid impervious material and defining a flat reelable configuration when collapsed, said third tube having a substantially smaller diameter when expanded than said first tube with said sealing means longitudinally securing said third tube to said first tube; and,
b) a plurality of conduits spaced along the length of said third tube and respectively communicating between the bore of said third tube and said second compartments, whereby pressurized gas supplied to an end of said third tube produces successive inflation of said second compartments.

38. The apparatus of claim 37, wherein said second adjacent compartments comprise an annular inflatable ring within said first compartments.

39. The apparatus of claim 29, further comprising:
a) a second valve means connecting to said second adjacent compartments through said first adjacent compartments for inflating said second adjacent compartments; and,
b) zipper means forming a part of said first compartments for providing access to said second valve means, said zipper means being resealable and capable of withstanding the pressurization of said first compartments.

40. The apparatus of claim 39, wherein said second adjacent compartments are separated by said sealing means.

41. The apparatus of claim 40, wherein said second adjacent compartments are concentric with said first adjacent compartments.

42. The apparatus of claim 41, wherein said second adjacent compartments comprise an annular inflatable ring within said first compartments.

43. The apparatus of claim 42, further comprising;
a) a hanging elongated collapsible tube formed of fluid impervious material, said hanging tube defining a flat reelable configuration when collapsed;
b) means for sealingly securing a longitudinal edge of said hanging tube to said first tube;
c) separating means for dividing the interior of said hanging tube into a plurality of adjacent hanging chambers extending along the length of said hanging tube; and,
d) a selected quantity of matter disposed in each said hanging chamber, said matter having a specific gravity substantially greater than that of water.

44. The apparatus of claim 43, wherein said second adjacent compartments comprise an annular inflatable ring within said first compartments.

45. The apparatus of claim 39, further comprising:
a) a third elongated collapsible tube being formed of fluid impervious material and defining a flat reelable configuration when collapsed, said third tube having a substantially smaller diameter when expanded than said first tube with said sealing means longitudinally securing said third tube to said first tube; and,
b) a plurality of conduits spaced along the length of said third tube and respectively communicating between the bore of said third tube and said second compartments, whereby pressurized gas supplied to an end of said third tube produces successive inflation of said second compartments.

46. The apparatus of claim 45, wherein said second adjacent compartments are inflatable to become substantially concentric with said first compartments.

* * * * *